US012754627B2

(12) United States Patent
Mitchell

(10) Patent No.: US 12,754,627 B2
(45) Date of Patent: Oct. 6, 2026

(54) TOUCHSCREEN DISPLAY WITH INTEGRATED ANTENNA

(71) Applicant: Cardtronics USA, Inc., Atlanta, GA (US)

(72) Inventor: Graeme Mitchell, Dundee (GB)

(73) Assignee: Cardtronics USA, Inc., Atlanta, GA (US)

( * ) Notice: Subject to any disclaimer, the term of this patent is extended or adjusted under 35 U.S.C. 154(b) by 0 days.

(21) Appl. No.: 18/973,724

(22) Filed: Dec. 9, 2024

(65) Prior Publication Data

US 2026/0161242 A1 Jun. 11, 2026

(51) Int. Cl.
*G06F 3/041* (2006.01)
*G07F 19/00* (2006.01)
*G06F 3/044* (2006.01)

(52) U.S. Cl.
CPC ........ *G06F 3/0412* (2013.01); *G06F 3/04162* (2019.05); *G07F 19/201* (2013.01); *G06F 3/044* (2013.01)

(58) Field of Classification Search
CPC .... G06F 3/0412; G06F 3/04162; G06F 3/044; G07F 19/201
See application file for complete search history.

(56) References Cited

U.S. PATENT DOCUMENTS 9,471,169 B2 * 10/2016 Schediwy ............. G06F 3/0412
11,163,405 B2 * 11/2021 Hartmann ........... G06F 3/04164
2013/0162594 A1 6/2013 Paulsen
2019/0361549 A1 11/2019 Gu
2021/0173520 A1 * 6/2021 Kida ........................ H04B 5/22

FOREIGN PATENT DOCUMENTS

CN 218568310 U 3/2023
EP 2677406 A1 12/2013
EP 3791252 B1 11/2024

OTHER PUBLICATIONS

European Search Report for corresponding European Application No. 25218500.4, Dated Apr. 29, 2026.

* cited by examiner

*Primary Examiner* — Lisa S Landis
(74) *Attorney, Agent, or Firm* — Notaro, Michalos & Zaccaria P.C.; John S Economou

(57) ABSTRACT

A touchscreen display has an outer protective glass layer, a touch-sensitive layer configured to detect touch inputs, a display layer, and an antenna positioned between the outer protective glass layer and the touch-sensitive layer. The antenna may be configured as an NFC antenna and may be a coil-shaped antenna. The NFC antenna may be formed from a conductive material selected from the group consisting of copper, aluminum, and silver. The conductive material may be a wire or metal trace. The NFC antenna may be positioned in an active area of the touchscreen display. An interior glass layer may be positioned between the outer protective glass layer and the touch-sensitive layer, and the NFC antenna may be between the outer protective glass layer and the interior glass layer. The touch-sensitive layer may be a capacitive touch-sensitive layer formed on a glass substrate. The display layer may be an LCD display.

20 Claims, 3 Drawing Sheets

TOUCHSCREEN DISPLAY WITH INTEGRATED ANTENNA

FIELD

The present invention relates to a touchscreen display including an integrated antenna, and more particularly to a touchscreen display in which the integrated antenna is used for Near Field Communication (NFC) and is located within a visible region of the touch screen display.

BACKGROUND

A touchscreen is an input device that allows users to interact with a computer or electronic device by touching the display portion of the touch screen directly. A touchscreen combines the functionality of a traditional display with that of an input device like a keyboard or mouse, making it an intuitive and interactive method of controlling devices. Touchscreens are used in a wide variety of devices, including smartphones, tablets, computers, payment terminals such as automated teller machines (ATMs) and kiosks, etc.

Near Field Communication (NFC) technology is widely used in a variety of devices such as smartphones, tablets, and payment terminals, enabling short-range wireless communication for applications such as contactless banking, payment, data transfer, and device pairing using a banking card configured for contactless NFC. Typically, NFC antennas for an NFC receiver are either placed on external surfaces of such devices or, for small devices like smartphones and tablets but not for devices with larger displays like ATMs and similar kiosks, behind the touchscreen, which limits design flexibility by taking up external surface area and, when placed behind the touchscreen, can result in interference with other components or a diminished read range the requirements set forth in the relevant standards for such devices.

Based on the foregoing, there is a need to provide an NFC antenna in a device like an ATM or similar-type kiosk having a touchscreen display larger than those used in smartphones and tablets in a way which reduces the amount of external surface area used while also reducing component interference and ensuring an appropriate read range.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure.

The present disclosure addresses the problems with prior solutions by positioning the NFC antenna within a visible area of the touchscreen display, sandwiched between an outer cover glass layer and an interior glass layer. Because the NFC antenna is formed from a conductive coil and is sandwiched between the two outermost glass layers of the touchscreen display, the resulting device reduces component interference over prior solutions in which the NFC antenna is positioned behind the display itself. In addition, this configuration provides a much better read range than prior solutions. Furthermore, placing the NFC antenna in an active display portion of the touchscreen display allows customer applications to be more interactive in the display portion surrounding the NFC antenna. For example, the customer application may generate a box around the NFC antenna on the display, with text within the box instructing a user to position their contactless banking card against the display in the space defined by the box. This provides an interactive interaction with the customer while reducing an amount of external space on the device incorporating the touchscreen display, e.g., an ATM, needed for externally facing components because no separate external module for the NFC antenna is required.

Figure 1:
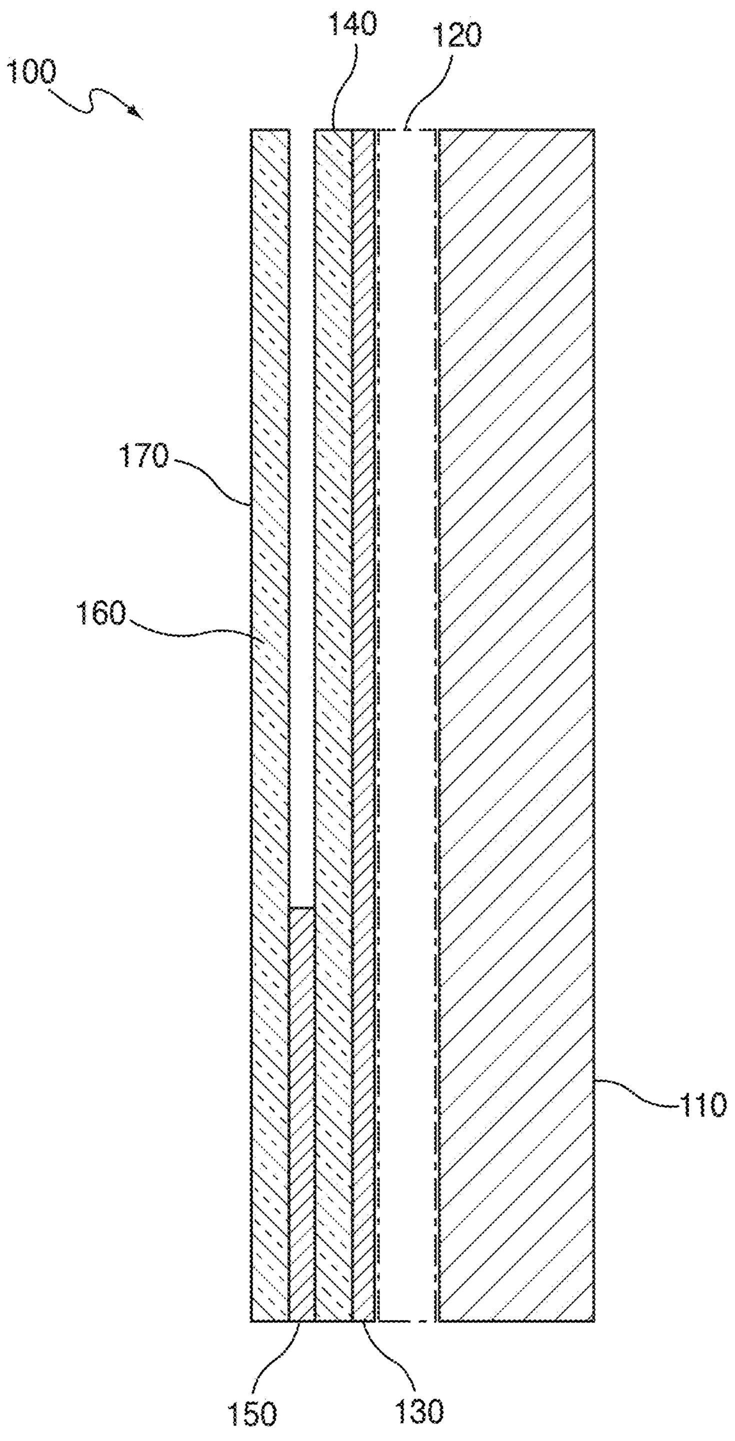
FIG. 1 is a cross-sectional view of a touchscreen display incorporating an NFC antenna embedded between layers thereof according to an aspect of the present disclosure.

Referring now to FIG. 1, a touchscreen display 100 is shown in cross-section consisting of a series of stacked layers. The touchscreen display 100 incorporates an NFC antenna 150 positioned between an outer (cover) glass layer 160 and an interior (separation) glass layer 140. The touchscreen display 100 has outer facing side 170 of the outer glass layer 160, and a touchscreen sensor layer 130 as known in the art, an optional air gap layer 120, and an active display portion 110. The active display portion 110 may be an LCD display as known in the art. The touchscreen sensor layer 130 (or touch-sensitive layer) may be implemented as a capacitive touchscreen as known in the art. For example, the touchscreen sensor layer 130 may incorporate a capacitive touch-sensitive layer (e.g., ITO layer) formed on a glass substrate. In the alternative, other touchscreen technologies may be used to form the touchscreen sensor layer 130, including, resistive, infrared, optical, surface acoustic wave, piezoelectric, inductive, and combinations thereof.

Figure 2:
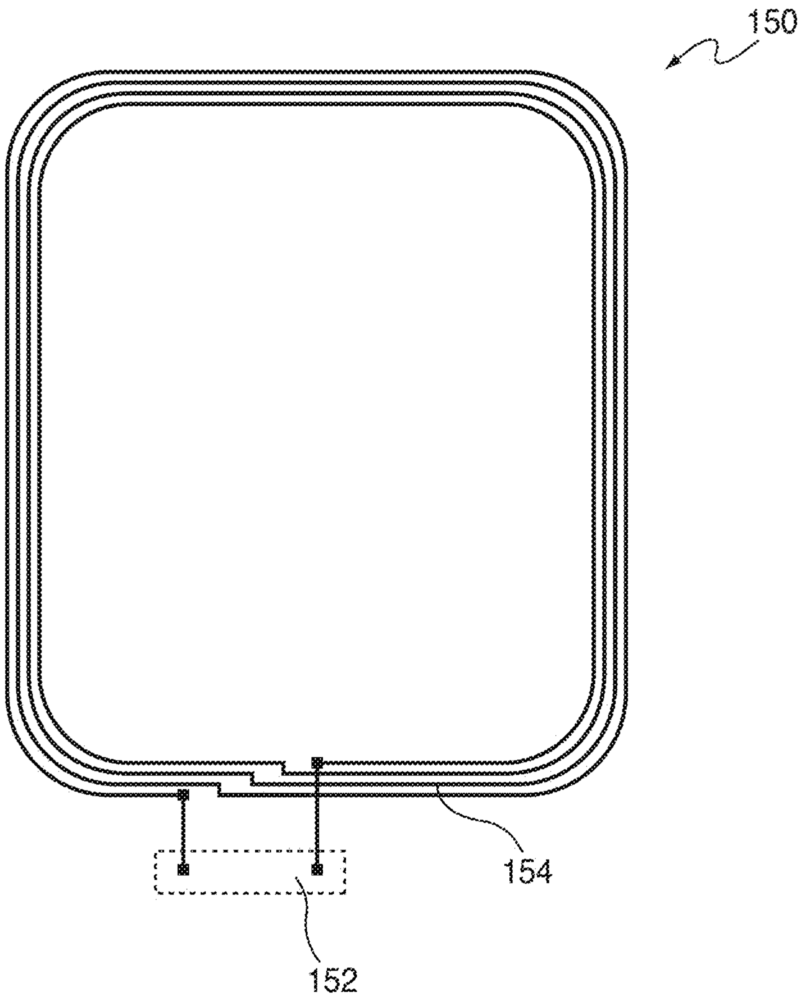
FIG. 2 is a plan view of the NFC antenna layout to be positioned with the touchscreen display according to an aspect of the present disclosure.

Referring now to FIG. 2, the NFC antenna 150 consists of terminals 152 connected to a conductor 154 that forms a series of loops. The conductor 154 is a conductive material such as a wire or trace have low resistance to ensure effectiveness and is preferably selected from either silver or tungsten, although copper or aluminum may provide adequate operation. NFC operates at a frequency of 13.56 MHz. The NFC antenna 154 should be designed to have a specific inductance (typically between 1 and 10 μH) to match the specifications of the selected NFC controller/reader integrated circuit. In FIG. 2, the NFC antenna 150 has four loops, but this is merely demonstrative, and the actual number of loops will depend on requirements of the selected NFC controller/reader integrated circuit, the diameter of formed loops, and the length of the conductor 154. The NFC antenna 150 may be in the form of a coil or loop to efficiently generate a magnetic field for inductive coupling with an NFC-enabled device (smart card). The NFC antenna 150 may have dimensions ranging between 30 mm to 100 mm in diameter, depending on the selected NFC controller/reader integrated circuit and the final shape of the coil.

Figure 3:
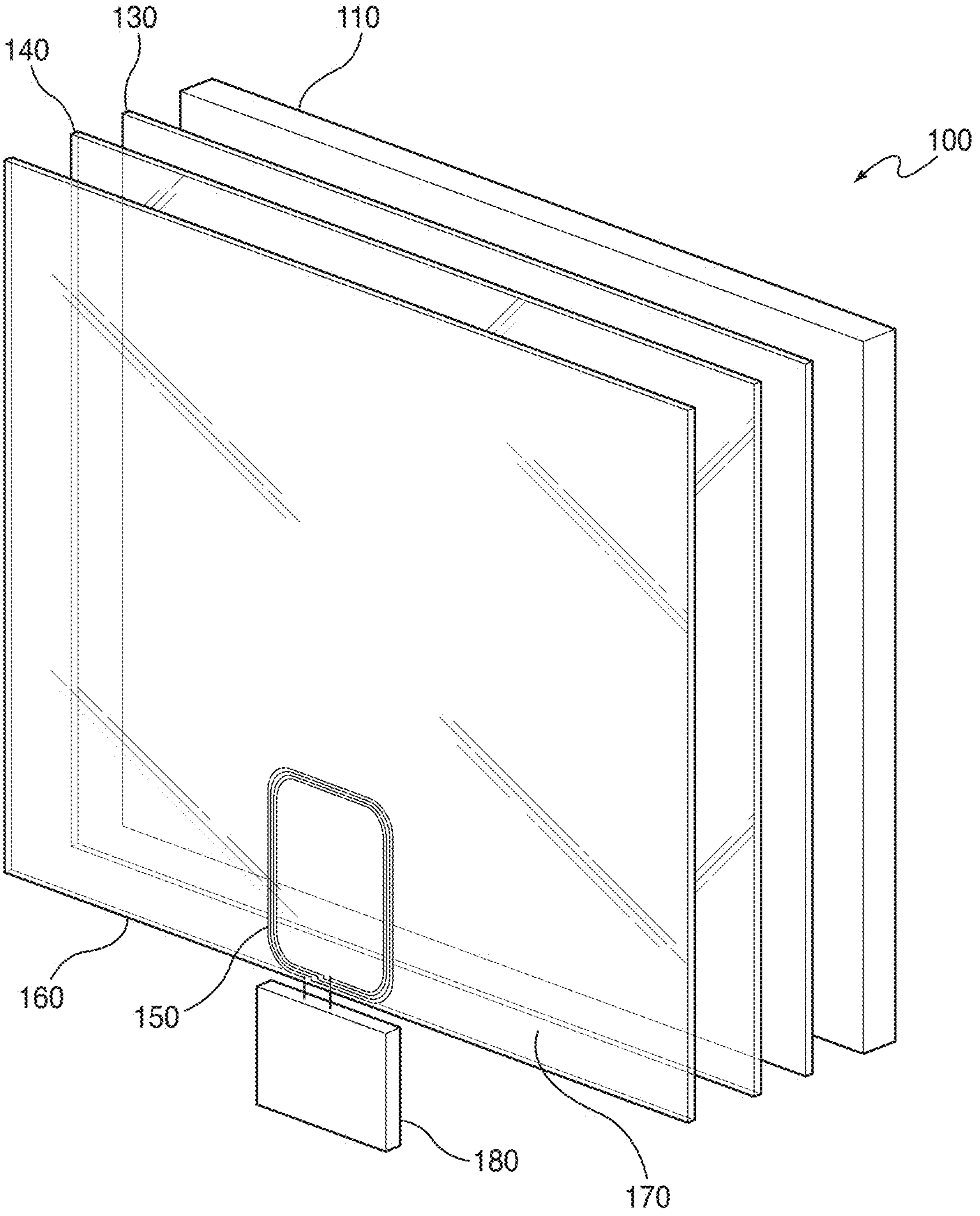
FIG. 3 is a perspective view of the touchscreen display showing the position of the NFC antenna and the electrical connections between the NFC antenna and an associated NFC module according to an aspect of the present disclosure.

As shown in FIG. 3, the NFC antenna 150 is positioned between the outer glass panel 160 and the interior glass panel 140 that covers the touchscreen sensor layer 130. This positioning ensures that the NFC antenna 150 does not interfere with the capacitive functionality of the touchscreen display 100, which is essential for the accurate detection of touch inputs. In addition, the placement of the NFC antenna 150 may be optimized to avoid interference with the touch sensing mechanisms of the touchscreen display 100, e.g., by using proper shielding techniques. The NFC antenna 150 is electrically connected to the NFC controller/reader integrated circuit 180 which controls the NFC communication. This electrical connection may be established through flexible printed circuit board (PCB) tracks or via holes provided within the glass layers of the touchscreen display 100. The NFC antenna 150 is wired in such a way to ensure that the signals can be sent and received the touch sensitivity of the touchscreen display 100.

To ensure that the NFC antenna 150 does not interfere with the capacitive sensing of the touchscreen display 100, appropriate shielding is preferably used around the NFC antenna 150. This shielding may be provided by either a conductive layer in the touchscreen stack or by careful placement of the antenna to avoid direct overlap with the active touch-sensitive areas.

The touchscreen display 100 of the present disclosure provides a number of advantages over prior solutions. Significant space savings are provided because the NFC antenna 150 is embedded within the touchscreen display 100 itself, eliminating the need for additional external components and thus freeing up external space on the outer surface of the associated device, e.g., on the front fascia of an ATM. In addition, by embedding the NFC antenna 150 within the touchscreen display 100, the overall design of the associated device (e.g., ATM) remains sleek and minimalistic without visible external antenna modules. Further, the placement of the NFC antenna 150 within the touchscreen display 100 ensures that NFC signals can be transmitted effectively while maintaining the integrity of the capacitive sensing of the touchscreen display 100. Finally, integrating the NFC antenna 150 directly into the touchscreen panel reduces the number of components and simplifies the assembly process, potentially lowering manufacturing costs.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A touchscreen display, comprising:
an outer protective glass layer;
a touch-sensitive layer configured to detect touch inputs;
a display layer; and
an antenna positioned between the outer protective glass layer and the touch-sensitive layer, wherein the antenna is positioned in an area of the touchscreen display that avoids overlap with active touch-sensitive areas thereof.

2. The touchscreen display of claim 1, wherein the antenna is configured as an NFC antenna.

3. The touchscreen display of claim 2, wherein the NFC antenna is configured as a coil-shaped antenna.

4. The touchscreen display of claim 2, wherein the NFC antenna is formed from a conductive material selected from the group consisting of tungsten, copper, aluminum, and silver.

5. The touchscreen display of claim 4, wherein the conductive material is a wire or metal trace.

6. The touchscreen display of claim 1, wherein the antenna is positioned in an active area of the touchscreen display.

7. The touchscreen display of claim 1, further comprising an interior glass layer between the outer protective glass layer and the touch-sensitive layer.

8. The touchscreen display of claim 7, wherein the antenna is positioned between the outer protective glass layer and the interior glass layer.

9. The touchscreen display of claim 1, wherein the touch-sensitive layer comprises a capacitive touch-sensitive layer formed on a glass substrate.

10. The touchscreen display of claim 1, wherein the display layer is an LCD display.

11. An automated teller machine (ATM), comprising:
a touchscreen display, comprising:
an outer protective glass layer;
a touch-sensitive layer configured to detect touch inputs;
a display layer; and
an antenna positioned between the outer protective glass layer and the touch-sensitive layer, wherein the antenna is positioned in an area of the touchscreen display that avoids overlap with active touch-sensitive areas thereof.

12. The ATM of claim 11, wherein the antenna is configured as an NFC antenna.

13. The ATM of claim 12, wherein the NFC antenna is configured as a coil-shaped antenna.

14. The ATM of claim 12, wherein the NFC antenna is formed from a conductive material selected from the group consisting of tungsten, copper, aluminum, and silver.

15. The ATM of claim 14, wherein the conductive material is a wire or metal trace.

16. The ATM of claim 11, wherein the antenna is positioned in an active area of the touchscreen display.

17. The ATM of claim 11, further comprising an interior glass layer between the outer protective glass layer and the touch-sensitive layer.

18. The ATM of claim 17, wherein the antenna is positioned between the outer protective glass layer and the interior glass layer.

19. The ATM of claim 11, wherein the touch-sensitive layer comprises a capacitive touch-sensitive layer formed on a glass substrate.

20. The ATM of claim 11, wherein the display layer is an LCD display.

* * * * *